(12) United States Patent
Kramer et al.

(10) Patent No.: US 8,795,547 B2
(45) Date of Patent: *Aug. 5, 2014

(54) REFRIGERATION OIL FROM GAS-TO-LIQUID-DERIVED AND BIO-DERIVED TRIESTERS

(75) Inventors: David C. Kramer, San Anselmo, CA (US); Ravindra Shah, Concord, CA (US); Stephen J. Miller, San Francisco, CA (US); Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,803

(22) Filed: Aug. 25, 2011

(65) Prior Publication Data

US 2013/0256586 A1 Oct. 3, 2013

Related U.S. Application Data

(63) Continuation-in-part of application No. 12/336,662, filed on Dec. 17, 2008, now abandoned.

(60) Provisional application No. 61/016,046, filed on Dec. 21, 2007.

(51) Int. Cl.
*C09K 5/04* (2006.01)
*C09K 5/10* (2006.01)

(52) U.S. Cl.
USPC ............ 252/68; 508/578; 508/444; 508/450; 508/451; 508/463; 508/459; 508/496

(58) Field of Classification Search
USPC ............ 252/68; 508/578, 444, 450, 451, 463, 508/459, 496
See application file for complete search history.

(56) References Cited

U.S. PATENT DOCUMENTS

| | | | | |
|---|---|---|---|---|
| 5,452,586 | A * | 9/1995 | Hamid | 62/84 |
| 5,656,578 | A * | 8/1997 | Tanaka et al. | 508/462 |
| 6,306,803 | B1 * | 10/2001 | Tazaki | 508/539 |
| 6,667,285 | B1 * | 12/2003 | Kawahara et al. | 508/485 |
| 7,018,961 | B2 * | 3/2006 | Tazaki | 508/579 |
| 7,544,645 | B2 * | 6/2009 | Miller et al. | 508/485 |
| 8,268,187 | B2 * | 9/2012 | Krammer et al. | 252/68 |
| 2004/0157753 | A1 * | 8/2004 | Tazaki et al. | 508/462 |
| 2006/0019840 | A1 * | 1/2006 | Kawahara et al. | 508/280 |
| 2008/0194444 | A1 * | 8/2008 | Miller et al. | 508/496 |
| 2009/0198075 | A1 * | 8/2009 | Miller et al. | 549/523 |

* cited by examiner

*Primary Examiner* — Douglas McGinty
(74) *Attorney, Agent, or Firm* — Jeffrey M. McQuiston

(57) ABSTRACT

The present invention is directed to a refrigerator oil composition comprising
(a) a triester species having the following structure:

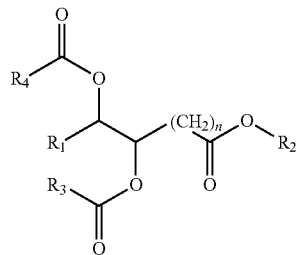

wherein $R_1$, $R_2$, $R_3$, and $R_4$ are the same or independently selected from hydrocarbon groups having from 2 to 20 carbon atoms and wherein "n" is an integer from 2 to 20; and
(b) a refrigerant, wherein the refrigerant is a halohydrocarbon.

9 Claims, 9 Drawing Sheets

Scheme 1

Scheme 1

(1B) 9,10-Bis-hexanoyloxy-octadecanoic acid hexyl ester (2B) 9,10-Bis-decanoyloxy-octadecanoic acid decyl ester (3B) 9,10-Bis-hexanoyloxy-octadecanoic acid methyl ester

Table 1

| Compound | VI | VIS cSt (40 °C) | VIS cSt (100 °C) | Pour point | Cloud Point |
|---|---|---|---|---|---|
|  (1)<br>Hexanoic acid 2-hexanoyloxy-1-hexyl-octyl ester | 68 | 9.32 | 2.42 | <-60 | -50 |
|  (2)<br>Decanoic acid 2-decanoyloxy-1-hexyl-octyl ester | 117 | 17.5 | 3.9 | -39 | 7 |
|  50/50 wt% mixture<br>50/50 mix of (1) and (2) | 101 | 12.8 | 3.1 | <-60 | -50 |

Examples of Commercial Refrigeration Oils and Their Properties

| Composition | VI | VIS cSt (40 °C) | VIS cSt (100 °C) | Pour Point (°C) | Cloud Point (°C) |
|---|---|---|---|---|---|
| Capella HFC 32 | 130 | 30.5 | 5.7 | -48 max | -- |
| Synative ES 3157 | 140 | ~46 | ~8 | -40 max | -20 |
| Capella HFC Auto | -- | 130 | 13.4 | -32 | -- |
| Polyoly Ester | 140 | 19.5 | 4.4 | -51 | -39 |
| VIS: Viscosity | | | | | |

FIG. 6

REFRIGERATION OIL FROM GAS-TO-LIQUID-DERIVED AND BIO-DERIVED TRIESTERS

CROSS REFERENCE TO RELATED APPLICATIONS

This application is a Continuation-in-Part Application of U.S. application Ser. No. 12/336,662 filed Dec. 17, 2008, abandoned Sep. 10, 2011, and Provisional Application No. 61/016,046, filed Dec. 21, 2007, and claims priority therefrom and herein incorporated in their entireties.

FIELD OF THE INVENTION

The present invention is directed to compositions suitable for use in refrigeration and air conditioning apparatus comprising at least one refrigerant, hydrofluorocarbon (i.e., HFC R-134A and R-410A), or mixtures thereof.

BACKGROUND OF THE INVENTION

Generally, naphthenic mineral oils, paraffinic mineral oils, alkylbenzenes, polyglycolic oils, ester oils and mixtures thereof, which have each a kinematic viscosity of 10-200 cSt at 40.degree. C., as well as these oils incorporated with suitable additives have been used as refrigerator oils.

On the other hand, chlorofluorocarbons (CFCS) type refrigerants, such as CFC-11, CFC-12, CFC-113 and HCFC-22, have been used for refrigerators.

Of these CFCS, CFCS such as CFC-11, CFC-12 and CFC-113, which are obtained by substituting all the hydrogen atoms of hydrocarbons thereof by halogen atoms including chlorine atoms, may lead to the destruction of the ozone layer, and therefore, the use of the CFCS has been controlled. Accordingly, halohydrocarbons, such as HFC-134a and HFC-152a, have been used as substitutes for CFCs. HFC-134a is especially promising as a substitute refrigerant since it is similar in thermodynamic properties to CFC-12 which has heretofore been used in many kinds of refrigerators of home cold-storage chests, air-conditioners and the like.

U.S. Pat. No. 7,544,645 was commonly owned at the time the subject invention was made.

A number of patents have discussed esters that are useful as refrigerator oils.

Sasaki et al., U.S. Pat. No. 6,582,621 disclose a refrigerator oil for us in compressors using there in a hydrogen-containing halocarbon as a refrigerant, consisting essentially of as a base oil at least one kind of ester selected from the group consisting of a specific pentaerythritol ester such as an ester of pentaerythritol with a mono- or dicarboxylic acid, a specific polyol ester such as an ester of trimethylolethane with a mono- or dicarboxylic, a specific ester such as an ester of ethylene glycol and a dicarboxylic acid, and a specific polyol ester synthesized from a neopentyl type polyhydric alcohol, a monocarboxylic acid and a dicarboxylic acid; and further comprising at least one kind of an epoxy compound.

Ankner et al., U.S. Patent Publication No. US 2004/0046146 disclose refrigerant compositions which comprise a hydrofluorocarbon based refrigerant, and mixed with the refrigerant, a polyol ester based lubricant. The polyol ester comprises a diol having a strong sterically hindered hydrogen attached to the carbon in position 2, said diol being esterified with a mixture of mono- and diabasic carboxylic acids.

Schnur, U.S. Pat. No. 6,551,523 discloses an ester blend, including an ester having neopentylglycol and a source of 2-ethylhexanoic acid as its reactive components and an ester having pentaerythritol and a source of 2-ethylhexanoic acid as its reactive components, is especially effective as a lubricant for chlorine-free fluorocarbon refrigerant heat transfer fluids, particularly Refrigerant 134a (1,1,1,2-tetrafluoroethane).

Shimomura et al., U.S. Pat. No. 7,045,490 disclose a refrigerating machine oil composition that comprises an alicyclic polycarboxylic acid ester compound obtained from the following compounds (a) to (c): (a) an alicyclic polycarboxylic acid having an alicyclic ring and two or more carboxyl groups are bonded to mutually adjacent carbon atoms on the alicyclic ring; (b) a compound with two or more hydroxyl groups or its derivative; and (c) a compound with one hydroxyl group or its derivative.

Glova U.S. Pat. No. 4,556,496 discloses a refrigeration lubricating oil composition comprising a branched-chain alkylbenzene or mixture of branched-chain alkylbenzenes containing a total of from 10 to 25 carbon atoms in the alkyl groups, and about 50 ppm to 5 weight percent of a dialkyl sulfosuccinate wherein each alkyl group has 3 to 7 carbon atoms.

Shimomura et al., U.S. Pat. No. 6,831,045 disclose a refrigerating machine oil composition comprising an alicyclic dicarboxylic acid ester compound containing an alicyclic ring and two ester groups represented by the following general formula:—COOR$^1$ where R$^1$ represents a hydrocarbon group of 1-30 carbons, where R$^1$ represents a hydrocarbon group of 1-30 carbons, the two ester groups bonded to mutually adjacent carbon atoms on the alicyclic ring, wherein the molar ratio of cis-forms and trans-forms for the orientation of the two ester groups of the alicyclic dicarboxylic acid ester compound is from 20/80 to 80/20.

Kawahara, US. Publication 2006/0019840A1 is directed to a lubricating oil for bearings. It is not a refrigerator oil composition such as those disclosed in this invention.

Kawahara is directed to adipate and azelate diesters made from terminal diols, not the vicinal diesters of the current invention.

SUMMARY OF THE INVENTION

The present invention is directed to a refrigerator oil composition comprising gas-to-liquid derived and bio-derived esters.

In one embodiment, the present invention is directed to a refrigerator oil composition comprising (a) a triester species having the following structure:

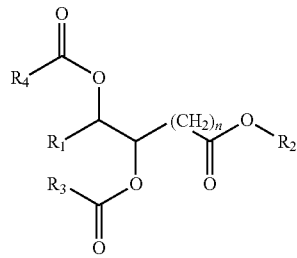

wherein $R_1$, $R_2$, $R_3$, and $R_4$ are the same or independently selected from hydrocarbon groups having from 2 to 20 carob atoms and wherein "n" is an integer from 2 to 20; and (b) a refrigerant, where the refrigerant is a halogenocarbon.

BRIEF DESCRIPTION OF THE DRAWINGS

FIG. 6 summarizes examples of commercial refrigeration oils.

DETAILED DESCRIPTION OF THE INVENTION

Definitions

Figure 1:
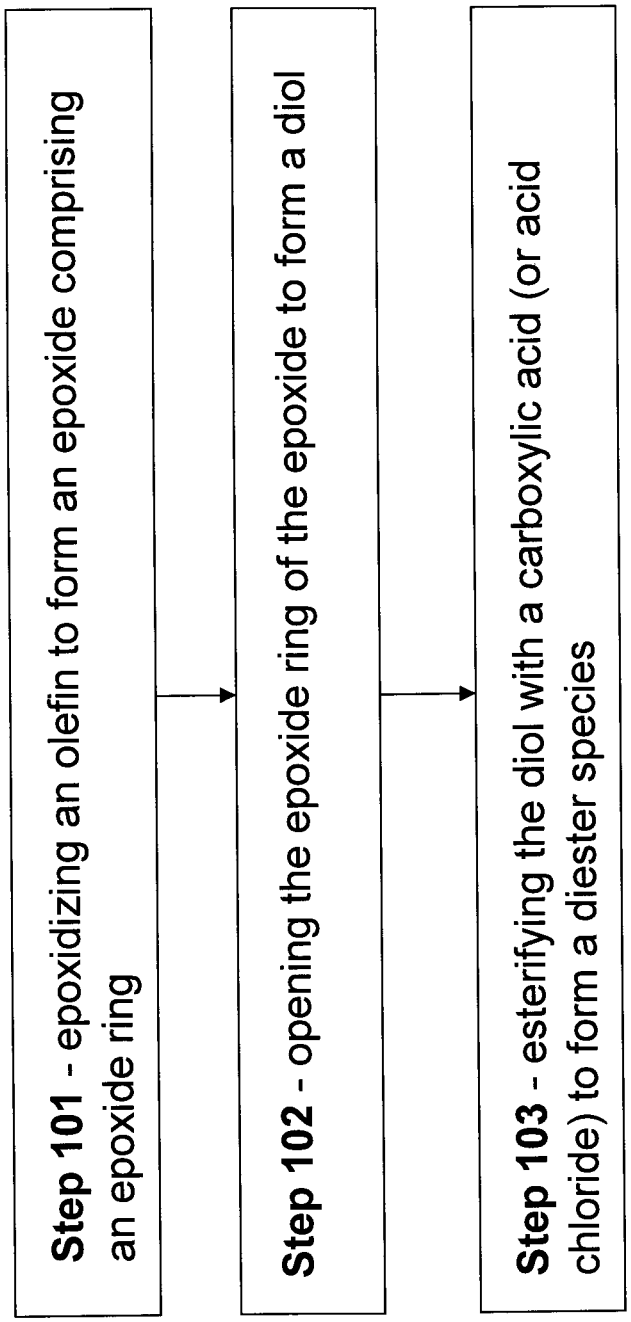
FIGS. 1 and 1A depicts processes for making triester-based compositions.

As used herein, the following terms have the following meanings unless expressly stated to the contrary:

"Lubricants," as defined herein, are substances (usually a fluid under operating conditions) introduced between two moving surfaces so to reduce the friction and wear between them. Base oils used as motor oils are generally classified by the American Petroleum Institute as being mineral oils (Group I, II, and III) or synthetic oils (Group IV and V). See American Petroleum Institute (API) Publication Number 1509.

"Pour point," as defined herein, represents the lowest temperature at which a fluid will pour or flow. See, e.g., ASTM International Standard Test Methods D 5950-96, D 6892-03, and D 97.

"Cloud point," as defined herein, represents the temperature at which a fluid begins to phase separate due to crystal formation. See, e.g., ASTM Standard Test Methods D 5773-95, D 2500, D 5551, and D 5771.

"Centistoke," abbreviated "cSt," is a unit for kinematic viscosity of a fluid (e.g., a lubricant), wherein 1 centistoke equals 1 millimeter squared per second (1 cSt=1 mm$^2$/s). See, e.g., ASTM Standard Guide and Test Methods D 2270-04, D 445-06, D 6074, and D 2983.

With respect to describing molecules and/or molecular fragments herein, "$R_n$," where "n" is an index, refers to a hydrocarbon group, wherein the molecules and/or molecular fragments can be linear and/or branched.

As defined herein, "$C_n$," where "n" is an integer, describes a hydrocarbon molecule or fragment (e.g., an alkyl group) wherein "n" denotes the number of carbon atoms in the fragment or molecule.

The prefix "bio," as used herein, refers to an association with a renewable resource of biological origin, such as resource generally being exclusive of fossil fuels.

The term "internal olefin," as used herein, refers to an olefin (i.e., an alkene) having a non-terminal carbon-carbon double bond (C=C). This is in contrast to "α-olefins" which do bear a terminal carbon-carbon double bond.

One embodiment of the invention is directed to a refrigerating oil composition comprising (a) a triester-based lubricant derived from a biomass precursor and/or low value Fischer-Tropsch (FT) olefins and/or alcohols and (b) a refrigerant. In some embodiments, such triester-based lubricants are derived from FT olefins and fatty (carboxylic) acids. In these or other embodiments, the fatty acids can be from a bio-based source (i.e., biomass, renewable source) or can be derived from FT alcohols via oxidation.

A. Esters

Triester-Based Lubricant

In one embodiment the refrigerator oil comprises a triester species having the following chemical structure:

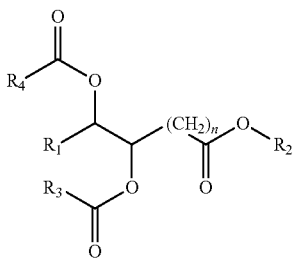

wherein $R_1$, $R_2$, $R_3$, and $R_4$ are the same or independently selected from hydrocarbon groups having from 2 to 20 carbon atoms and wherein "n" is an integer from 2 to 20.

Regarding the above-mentioned triester species, selection of $R_1$, $R_2$, $R_3$, $R_4$, and n can follow any or all of several criteria. For example, in some embodiments, $R_1$, $R_2$, $R_3$, $R_4$ and n are selected such that the kinematic viscosity of the composition at a temperature of 100° C. is typically 3 centistokes or greater. In some or other embodiments, $R_1$, $R_2$, $R_3$, $R_4$ and n are selected such that the pour point of the resulting lubricant is −20° C. or lower. In some embodiments, $R_1$ is selected to have a total carbon number of from 6 to 12. In these or other embodiments, $R_2$ is selected to have a carbon number of from 1 to 20. In these or other embodiments, $R_3$ and $R_4$ are selected to have a combined carbon number of from 4 to 36. In these or other embodiments, n is selected to be an integer from 5 to 10. Depending on the embodiment, such resulting triester species can typically have a molecular mass between 400 atomic mass units (a.m.u.) and 1100 a.m.u, and more typically between 450 a.m.u. and 1000 a.m.u.

In some embodiments, such above-described compositions are substantially homogeneous in terms of their triester component. In some or other embodiments, the triester component of such compositions comprises a variety (i.e., a mixture) of such triester species. In these or other embodiments, such above-described lubricant compositions further comprise one or more diester species.

In some of the above-described embodiments, the triester-based lubricant composition comprises one or more triester species of the type 9,10-bis-alkanoyloxy-octadecanoic acid alkyl ester and isomers and mixtures thereof, where the alkyl is selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, and octadecyl; and where the alkanoyloxy is selected from the group consisting of ethanoyloxy, propanoyoxy, butanoyloxy, pentanoyloxy, hexanoyloxy, heptanoyloxy, octanoyloxy, nonaoyloxy, decanoyloxy, undacanoyloxy, dodecanoyloxy, tridecanoyloxy, tetradecanoyloxy, pentadecanoyloxy, hexadeconoyloxy, and octadecanoyloxy. 9,10-bis-hexanoyloxy-octadecanoic acid hexyl ester and 9,10-bis-decanoyloxy-octadecanoic acid decyl ester are exemplary such triesters.

In some embodiments, the triester-based lubricant composition further comprises a base oil selected from the group consisting of Group I oils, Group II oils, Group III oils, and mixtures thereof.

It is worth noting that in most applications, the above-described triesters and their compositions are may be used as blending stocks. As such, esters with higher pour points may also be used as blending stocks with other lubricant oils, such as refrigerator oils, since they are very soluble in hydrocarbons and hydrocarbon-based oils.

Methods of Making Triester Lubricants

As mentioned above, the present invention is additionally directed to methods of making the above-described lubricant compositions and/or the triester compositions contained therein.

Referring to the flow diagram shown in FIG. 1, in some embodiments, processes for making the above-mentioned triester-based compositions, typically having lubricating base oil viscosity and pour point, comprise the following steps: (Step 101) esterifying (i.e., subjecting to esterification) a mono-unsaturated fatty acid (or quantity of mono-unsaturated fatty acids) having a carbon number of from 16 to 22 with an alcohol to form an unsaturated ester (or a quantity thereof); (Step 102) epoxidizing the unsaturated ester to form an epoxy-ester species comprising an epoxide ring; (Step 103) opening the epoxide ring of the epoxy-ester species to form a dihydroxy-ester; and (Step 104) esterifying the dihydroxy-ester with an esterifying species to form a triester species, wherein such esterifying species are selected from the group consisting of carboxylic acids, acyl halides, acyl anhydrides, and combinations thereof; and wherein such esterifying species have a carbon number of from 2 to 18. Generally, lubricant compositions made by such methods and comprising such triester species have a viscosity of 3 centistokes or more at a temperature of 100° C. and they typically have a pour point of less than −20° C., and selection of reagents and/or mixture components is typically made with this objective.

In some embodiments, where a quantity of such triester species is formed, the quantity of triester species can be substantially homogeneous, or it can be a mixture of two or more different such triester species. In any such embodiments, such triester compositions can be further mixed with one or more base oils of the type Group I-III. Additionally or alternatively, in some embodiments, such methods further comprise a step of blending the triester composition(s) with one or more diester species.

In some embodiments, such methods produce compositions comprising at least one triester species of the type 9,10-bis-alkanoyloxy-octadecanoic acid alkyl ester and isomers and mixtures thereof, where the alkyl is selected from the group consisting of methyl, ethyl, propyl, butyl, pentyl, hexyl, heptyl, octyl, nonyl, decyl, undecyl, dodecyl, tridecyl, tetradecyl, pentadecyl, hexadecyl, and octadecyl; and where the alkanoyloxy is selected from the group consisting of ethanoyloxy, propanoyoxy, butanoyloxy, pentanoyloxy, hexanoyloxy, heptanoyloxy, octanoyloxy, nonaoyloxy, decanoyloxy, undacanoyloxy, dodecanoyloxy, tridecanoyloxy, tetradecanoyloxy, pentadecanoyloxy, hexadeconoyloxy, and octadecanoyloxy. Exemplary such triesters include, but not limited to, 9,10-bis-hexanoyloxy-octadecanoic acid hexyl ester; 9,10-bis-octanoyloxy-octadecanoic acid hexyl ester; 9,10-bis-decanoyloxy-octadecanoic acid hexyl ester; 9,10-bis-dodecanoyoxy-octadecanoic acid hexyl ester; 9,10-bis-hexanoyloxy-octadecanoic acid decyl ester; 9,10-bis-decanoyloxy-octadecanoic acid decyl ester; 9,10-bis-octanoyloxy-octadecanoic acid decyl ester; 9,10-bis-dodecanoyloxy-octadecanoic acid decyl ester; 9,10-bis-hexanoyloxy-octadecanoic acid octyl ester; 9,10-bis-octanoyloxy-octadecanoic acid octyl ester; 9,10-bis-decanoyloxy-octadecanoic acid octyl ester; 9,10-bis-dodecanoyloxy-octadecanoic acid octyl ester; 9,10-bis-hexanoyloxy-octadecanoic acid dodecyl ester; 9,10-bis-octanoyloxy-octadecanoic acid dodecyl ester; 9,10-bis-decanoyloxy-octadecanoic acid dodecyl ester; 9,10-bis-dodecanoyloxy-octadecanoic acid dodecyl ester; and mixtures thereof.

In some such above-described method embodiments, the mono-unsaturated fatty acid can be a bio-derived fatty acid. In some or other such above-described method embodiments, the alcohol(s) can be FT-produced alcohols.

In some such above-described method embodiments, the step of esterifying (i.e., esterification) the mono-unsaturated fatty acid can proceed via an acid-catalyzed reaction with an alcohol using, e.g., $H_2SO_4$ as a catalyst. In some or other embodiments, the esterifying can proceed through a conversion of the fatty acid(s) to an acyl halide (chloride, bromide, or iodide) or acyl anhydride, followed by reaction with an alcohol.

Regarding the step of epoxidizing (i.e., the epoxidation step), in some embodiments, the above-described mono-unsaturated ester can be reacted with a peroxide (e.g., $H_2O_2$) or a peroxy acid (e.g., peroxyacetic acid) to generate an epoxy-ester species. See, e.g., D. Swern, in *Organic Peroxides Vol. II*, Wiley-Interscience, New York, 1971, pp. 355-533; and B. Plesnicar, in *Oxidation in Organic Chemistry, Part C*, W. Trahanovsky (ed.), Academic Press, New York 1978, pp. 221-253. Additionally or alternatively, the olefinic portion of the mono-unsaturated ester can be efficiently transformed to the corresponding dihydroxy ester by highly selective reagents such as osmium tetra-oxide (M. Schroder, Chem. Rev. vol. 80, p. 187, 1980) and potassium permanganate (Sheldon and Kochi, in *Metal-Catalyzed Oxidation of Organic Compounds*, pp. 162-171 and 294-296, Academic Press, New York, 1981).

Regarding the step of epoxide ring opening to the corresponding dihydroxy-ester, this step is usually an acid-catalyzed hydrolysis. Exemplary acid catalysts include, but are not limited to, mineral-based Brönsted acids (e.g., HCl, $H_2SO_4$, $H_3PO_4$, perhalogenates, etc.), Lewis acids (e.g., $TiCl_4$ and $AlCl_3$), solid acids such as acidic aluminas and silicas or their mixtures, and the like. See, e.g., Chem. Rev. vol. 59, p. 737, 1959; and Angew. Chem. Int. Ed., vol. 31, p. 1179, 1992. The epoxide ring opening to the diol can also be accomplished by base-catalyzed hydrolysis using aqueous solutions of KOH or NaOH.

Regarding the step of esterifying the dihydroxy-ester to form a triester, an acid is typically used to catalyze the reaction between the —OH groups of the diol and the carboxylic acid(s). Suitable acids include, but are not limited to, sulfuric acid (Munch-Peterson, Org. Synth., V, p. 762, 1973), sulfonic acid (Allen and Sprangler, Org. Synth., III, p. 203, 1955), hydrochloric acid (Eliel et al., Org. Synth., IV, p. 169, 1963), and phosphoric acid (among others). In some embodiments, the carboxylic acid used in this step is first converted to an acyl chloride (or another acyl halide) via, e.g., thionyl chloride or $PCl_3$. Alternatively, an acyl chloride (or other acyl halide) could be employed directly. Where an acyl chloride is used, an acid catalyst is not needed and a base such as pyridine, 4-dimethylaminopyridine (DMAP) or triethylamine (TEA) is typically added to react with an HCl produced. When pyridine or DMAP is used, it is believed that these amines also act as a catalyst by forming a more reactive acylating intermediate. See, e.g., Fersh et al., J. Am. Chem. Soc., vol. 92, pp. 5432-5442, 1970; and Hofle et al., Angew. Chem. Int. Ed. Engl., vol. 17, p. 569, 1978. Additionally or alternatively, the carboxylic acid could be converted into an acyl anhydride and/or such species could be employed directly.

Regardless of the source of the mono-unsaturated fatty acid, in some embodiments, the carboxylic acids (or their acyl derivatives) used in the above-described methods are derived from biomass. In some such embodiments, this involves the extraction of some oil (e.g., triglyceride) component from the biomass and hydrolysis of the triglycerides of which the oil component is comprised so as to form free carboxylic acids.

Figure 2:
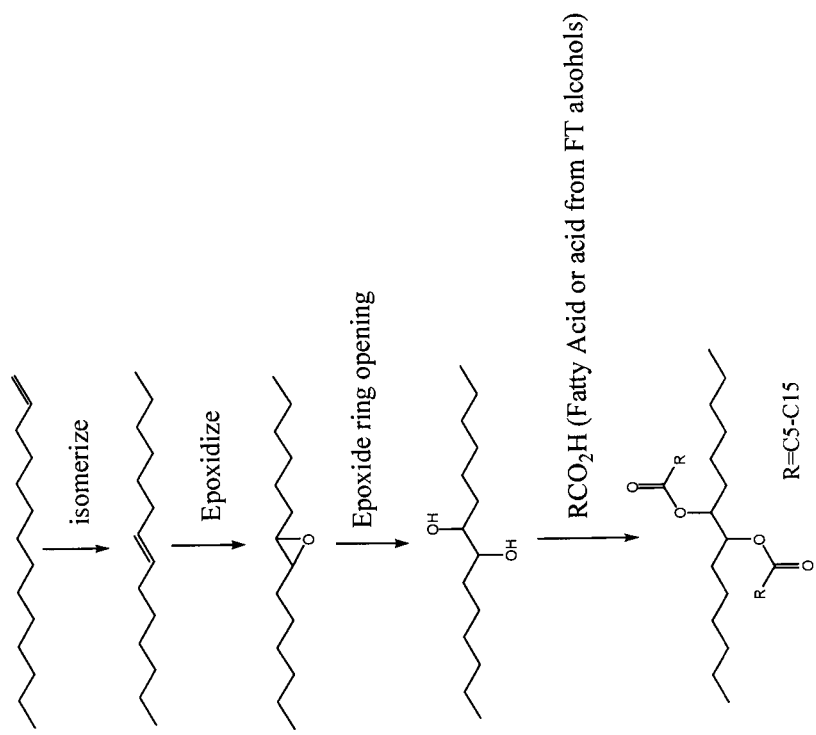
FIGS. 2 and 2A illustrate synthetic strategies for the conversion of olefins and oleic acids to diester and triester derivatives, respectively.
Figure 3:
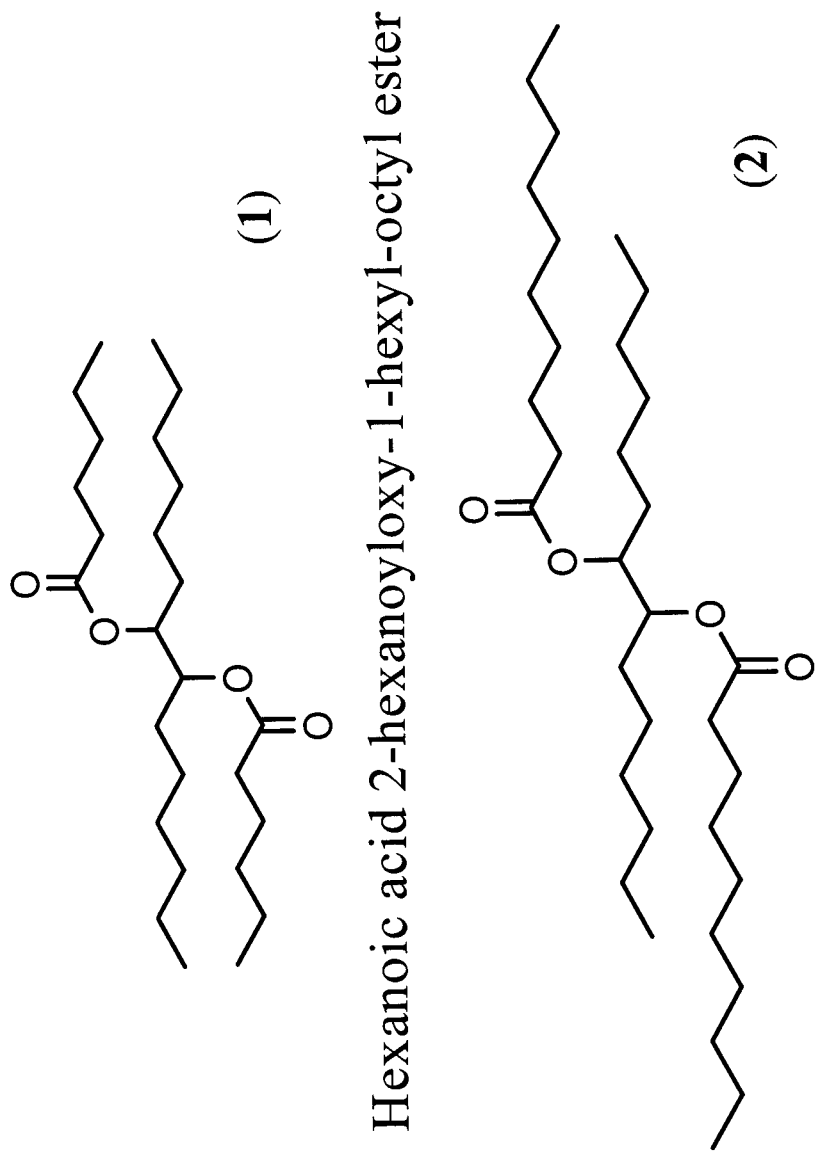
FIGS. 3, 3A and 4 illustrate structures of diesters and triesters herein.

Using a synthetic strategy in accordance with that outlined in Scheme 1 (FIG. 2), oleic acid was converted to triester derivatives 1 (9,10-bis-hexanoyloxy-octadecanoic acid hexyl ester) and 2 (9,10-bis-decanoyloxy-octadecanoic acid decyl ester), shown in FIG. 3. Referring to FIG. 2, Scheme 1, oleic acid (201) is esterified to yield mono-unsaturated ester (202). Mono-unsaturated ester 202 is subjected to an epoxidation agent to give epoxy-ester species 203. The epoxy-ester species 203 undergoes ring-opening to yield dihydroxy ester 204, which can then be reacted with acyl chloride (205) to yield triester product 206.

The strategy of the above-described synthesis utilizes the double bond functionality in oleic acid by converting it to the diol via double bond epoxidation followed by epoxide ring opening. Accordingly, the synthesis begins by converting oleic acid to the appropriate alkyl oleate followed by epoxidation and epoxide ring opening to the corresponding diol derivative (dihydroxy ester). Triesters 1-3 were made using synthetic procedures described more fully in Examples 1-7 (vide infra). Triester 1 was made from oleic acid, hexyl alcohol and hexanoyl chloride. Triester 2 was derived from oleic acid, decyl alcohol and decanoyl chloride. Triester 3 was derived from oleic acid, methyl alcohol and hexanoyl chloride.

Variations

Variations on the above-described methods include, but are not limited to, generating (and utilizing) compositional ranges of triesters by blending and/or by compositional variation in the reagents used during the synthesis of the triester species described herein. Compositions produced by such method variations will, naturally, be variations themselves. All such variations fall within the scope of the compositions and methods described herein.

Additional Oils

Optionally, the refrigerator oil may also comprise other esters, including but not limited a diester species. In one embodiment the refrigerator oil also comprises a diester species having the following chemical structure:

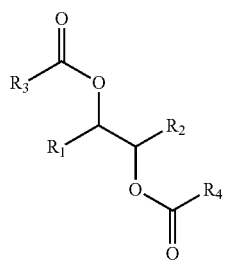

where $R_1$, $R_2$, $R_3$, and $R_4$ are the same or independently selected from a $C_2$ to $C_{17}$ carbon fragment.

Regarding the above-mentioned diester species, selection of $R_1$, $R_2$, $R_3$, and $R_4$ can follow any or all of several criteria. For example, in some embodiments, $R_1$, $R_2$, $R_3$, and $R_4$ are selected such that the kinematic viscosity of the composition at a temperature of 100° C. is typically 3 centistokes (cSt) or greater. In some or other embodiments, $R_1$, $R_2$, $R_3$, and $R_4$ are selected such that the pour point of the resulting lubricant is −20° C. or lower. In some embodiments, $R_1$ and $R_2$ are selected to have a combined carbon number (i.e., total number of carbon atoms) of from 6 to 14. In these or other embodiments, $R_3$ and $R_4$ are selected to have a combined carbon number of from 10 to 34. Depending on the embodiment, such resulting diester species can have a molecular mass between 340 atomic mass units (a.m.u.) and 780 a.m.u.

In some embodiments, such above-described compositions are substantially homogeneous in terms of their diester component. In some or other embodiments, the diester component of such compositions comprises a variety (i.e., a mixture) of diester species.

In some embodiments, the diester-based lubricant composition comprises at least one diester species derived from a $C_8$ to $C_{16}$ olefin and a $C_2$ to $C_{18}$ carboxylic acid. Typically, the diester species are made by reacting each —OH group (on the intermediate) with a different acid, but such diester species can also be made by reacting each —OH group with the same acid.

In some of the above-described embodiments, the diester-based lubricant composition comprises a diester species selected from the group consisting of decanoic acid 2-decanoyloxy-1-hexyl-octyl ester and its isomers, tetradecanoic acid-1-hexyl-2-tetradecanoyloxy-octyl esters and its isomers, dodecanoic acid 2-dodecanoyloxy-1-hexyl-octyl ester and its isomers, hexanoic acid 2-hexanoyloxy-1-hexy-octyl ester and its isomers, octanoic acid 2-octanoyloxy-1-hexyl-octyl ester and its isomers, hexanoic acid 2-hexanoyloxy-1-pentyl-heptyl ester and isomers, octanoic acid 2-octanoyloxy-1-pentyl-heptyl ester and isomers, decanoic acid 2-decanoyloxy-1-pentyl-heptyl ester and isomers, decanoic acid-2-cecanoyloxy-1-pentyl-heptyl ester and its isomers, dodecanoic acid-2-dodecanoyloxy-1-pentyl-heptyl ester and isomers, tetradecanoic acid 1-pentyl-2-tetradecanoyloxy-heptyl ester and isomers, tetradecanoic acid 1-butyl-2-tetradecanoyloxy-hexy ester and isomers, dodecanoic acid-1-butyl-2-dodecanoyloxy-hexyl ester and isomers, decanoic acid 1-butyl-2-decanoyloxy-hexyl ester and isomers, octanoic acid 1-butyl-2-octanoyloxy-hexyl ester and isomers, hexanoic acid 1-butyl-2-hexanoyloxy-hexyl ester and isomers, tetradecanoic acid 1-propyl-2-tetradecanoyloxy-pentyl ester and isomers, dodecanoic acid 2-dodecanoyloxy-1-propyl-pentyl ester and isomers, decanoic acid 2-decanoyloxy-1-propyl-pentyl ester and isomers, octanoic acid 1-2-octanoyloxy-1-propyl-pentyl ester and isomers, hexanoic acid 2-hexanoyloxy-1-propyl-pentyl ester and isomers, and mixtures thereof.

In some embodiments, the diester-based lubricant composition further comprises a base oil selected from the group consisting of Group I oils, Group II oils, Group III oils, and mixtures thereof.

It is worth noting that in most applications, the above-described di-esters and their compositions may be used as blending stocks. As such, di-esters with higher pour points may also be used as blending stocks with other lubricant oils, such as refrigerator oils, since they are very soluble in hydrocarbons and hydrocarbon-based oils.

Methods of Making Diester Lubricants

As mentioned above, the present invention is additionally directed to methods of making the above-described lubricant compositions.

Figure 1A:
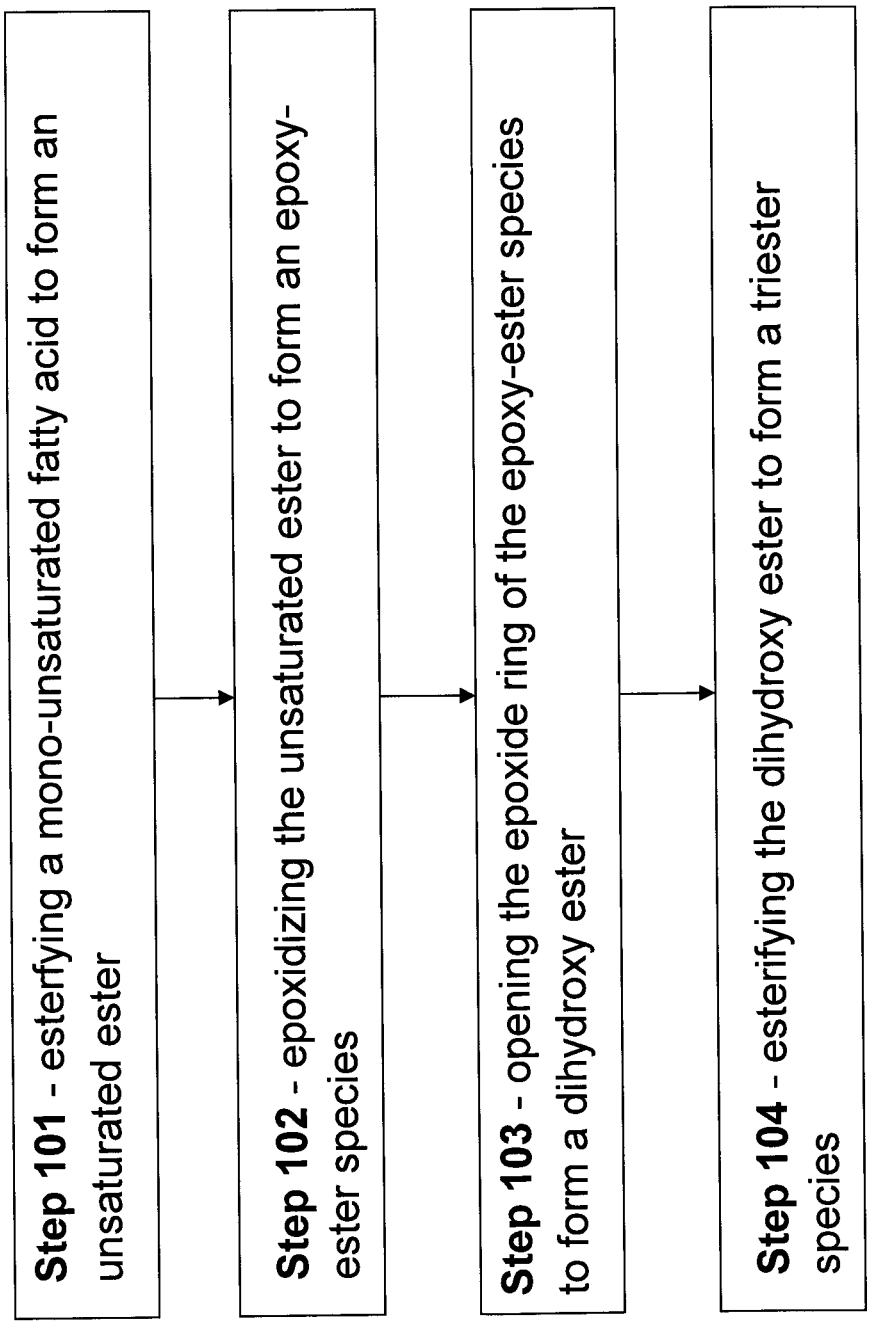

Referring to the flow diagram shown in FIG. 1A, in some embodiments, processes for making the above-mentioned diester species, typically having lubricating base oil viscosity and pour point, comprise the following steps: (Step 101A) epoxidizing an olefin (or quantity of olefins) having a carbon number of from 8 to 16 to form an epoxide comprising an epoxide ring; (Step 102A) opening the epoxide ring to form a diol; and (Step 103A) esterifying (i.e., subjecting to esterification) the diol with an esterifying species to form a diester species, wherein such esterifying species are selected from the group consisting of carboxylic acids, acyl acids, acyl halides, acyl anhydrides, and combinations thereof; wherein such esterifying species have a carbon number from 2 to 18; and wherein the diester species have a viscosity of 3 centistokes or more at a temperature of 100° C.

In some embodiments, where a quantity of such diester species is formed, the quantity of diester species can be substantially homogeneous, or it can be a mixture of two or more different such diester species.

In some such above-described method embodiments, the olefin used is a reaction product of a Fischer-Tropsch process. In these or other embodiments, the carboxylic acid can be derived from alcohols generated by a Fischer-Tropsch process and/or it can be a bio-derived fatty acid.

In some embodiments, the olefin is an α-olefin (i.e., an olefin having a double bond at a chain terminus). In such embodiments, it is usually necessary to isomerize the olefin so as to internalize the double bond. Such isomerization is typically carried out catalytically using a catalyst such as, but not limited to, crystalline aluminosilicate and like materials and aluminophosphates. See, e.g., U.S. Pat. Nos. 2,537,283; 3,211,801; 3,270,085; 3,327,014; 3,304,343; 3,448,164; 4,593,146; 3,723,564 and 6,281,404; the last of which claims a crystalline aluminophosphate-based catalyst with 1-dimensional pores of size between 3.8 Å and 5 Å.

Figure 2A:
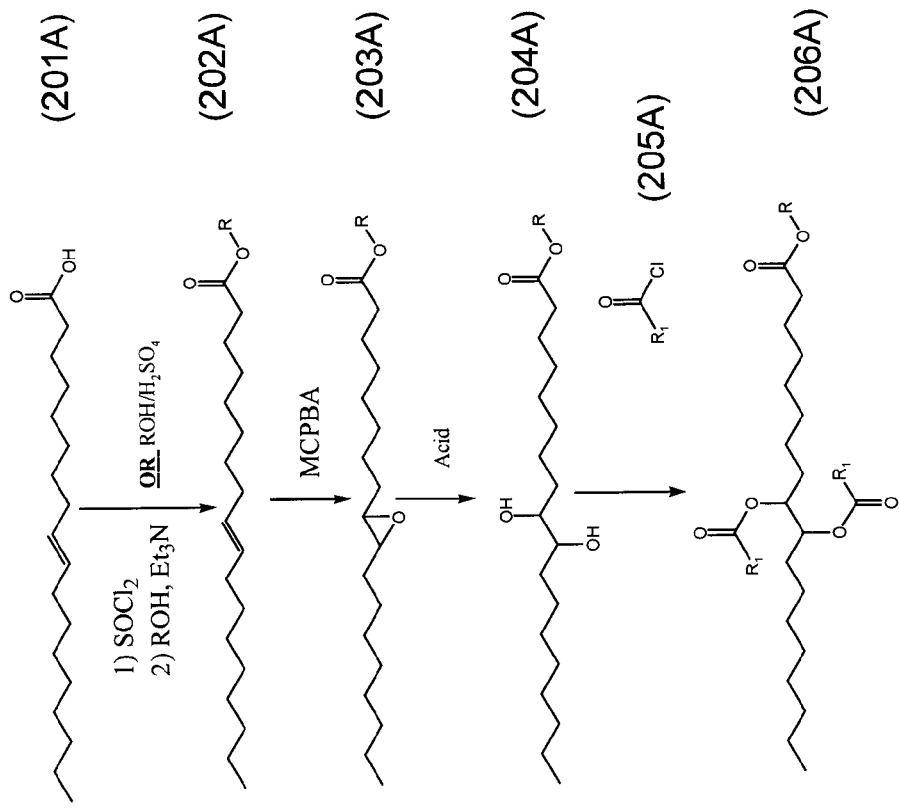

As an example of such above-described isomerizing and as indicated in Scheme 1 (FIG. 2A), Fischer-Tropsch alpha olefins (α-olefins) can be isomerized to the corresponding internal olefins followed by epoxidation. The epoxides can then be transformed to the corresponding diols via epoxide ring opening followed by di-acylation (i.e., di-esterification) with the appropriate carboxylic acids or their acylating derivatives. It is typically necessary to convert alpha olefins to internal olefins because diesters of alpha olefins, especially short chain alpha olefins, tend to be solids or waxes. "Internalizing" alpha olefins followed by transformation to the diester functionalities introduces branching along the chain which reduces the pour point of the intended products. The ester groups with their polar character would further enhance the viscosity of the final product. Adding the ester branches will increase the carbon number and hence viscosity. It can also decrease the associated pour and cloud points. It is typically preferable to have a few longer branches than many short branches, since increased branching tends to lower the viscosity index (VI).

Regarding the step of epoxidizing (i.e., the epoxidation step), in some embodiments, the above-described olefin (preferably an internal olefin) can be reacted with a peroxide (e.g., $H_2O_2$) or a peroxy acid (e.g., peroxyacetic acid) to generate an epoxide. See, e.g., D. Swern, in *Organic Peroxides Vol. II*, Wiley-Interscience, New York, 1971, pp. 355-533; and B. Plesnicar, in *Oxidation in Organic Chemistry, Part C*, W. Trahanovsky (ed.), Academic Press, New York 1978, pp. 221-253. Olefins can be efficiently transformed to the corresponding diols by highly selective reagent such as osmium tetra-oxide (M. Schroder, Chem. Rev. vol. 80, p. 187, 1980) and potassium permanganate (Sheldon and Kochi, in *Metal-Catalyzed Oxidation of Organic Compounds*, pp. 162-171 and 294-296, Academic Press, New York, 1981).

Regarding the step of epoxide ring opening to the corresponding diol, this step can be acid-catalyzed or based-catalyzed hydrolysis. Exemplary acid catalysts include, but are not limited to, mineral-based Brönsted acids (e.g., HCl, $H_2SO_4$, $H_3PO_4$, perhalogenates, etc.), Lewis acids (e.g., $TiCl_4$ and $AlCl_3$) solid acids such as acidic aluminas and silicas or their mixtures, and the like. See, e.g., Chem. Rev. vol. 59, p. 737, 1959; and Angew. Chem. Int. Ed., vol. 31, p. 1179, 1992. Based-catalyzed hydrolysis typically involves the use of bases such as aqueous solutions of sodium or potassium hydroxide.

Regarding the step of esterifying (esterification), an acid is typically used to catalyze the reaction between the —OH groups of the diol and the carboxylic acid(s). Suitable acids include, but are not limited to, sulfuric acid (Munch-Peterson, Org. Synth., V, p. 762, 1973), sulfonic acid (Allen and Sprangler, Org. Synth., III, p. 203, 1955), hydrochloric acid (Eliel et al., Org. Synth., IV, p. 169, 1963), and phosphoric acid (among others). In some embodiments, the carboxylic acid used in this step is first converted to an acyl chloride (via, e.g., thionyl chloride or $PCl_3$). Alternatively, an acyl chloride could be employed directly. Wherein an acyl chloride is used, an acid catalyst is not needed and a base such as pyridine, 4-dimethylaminopyridine (DMAP) or triethylamine (TEA) is typically added to react with an HCl produced. When pyridine or DMAP is used, it is believed that these amines also act as a catalyst by forming a more reactive acylating intermediate. See, e.g., Fersh et al., J. Am. Chem. Soc., vol. 92, pp. 5432-5442, 1970; and Hofle et al., Angew. Chem. Int. Ed. Engl., vol. 17, p. 569, 1978.

Regardless of the source of the olefin, in some embodiments, the carboxylic acid used in the above-described method is derived from biomass. In some such embodiments, this involves the extraction of some oil (e.g., triglyceride) component from the biomass and hydrolysis of the triglycerides of which the oil component is comprised so as to form free carboxylic acids.

Figure 3A:
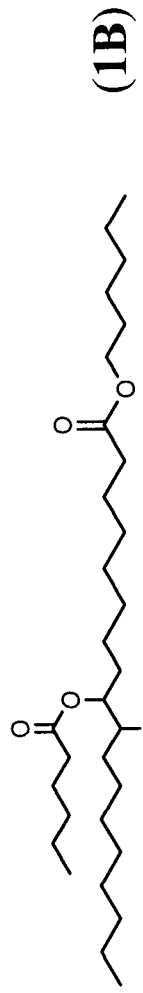
Figure 3A:
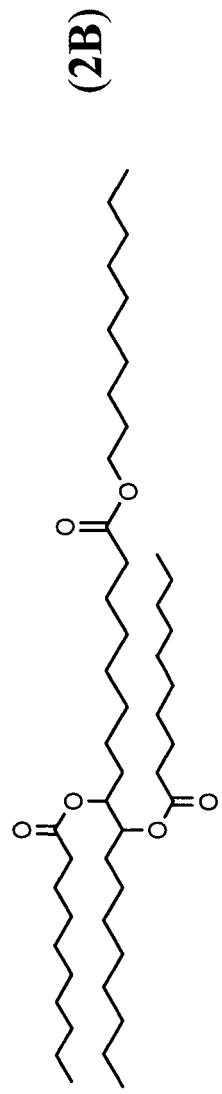
Figure 3A:
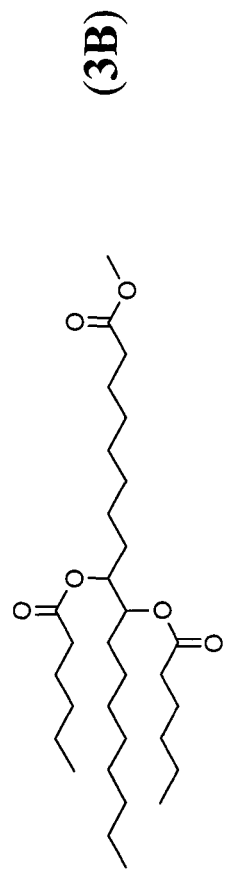
Figure 4:
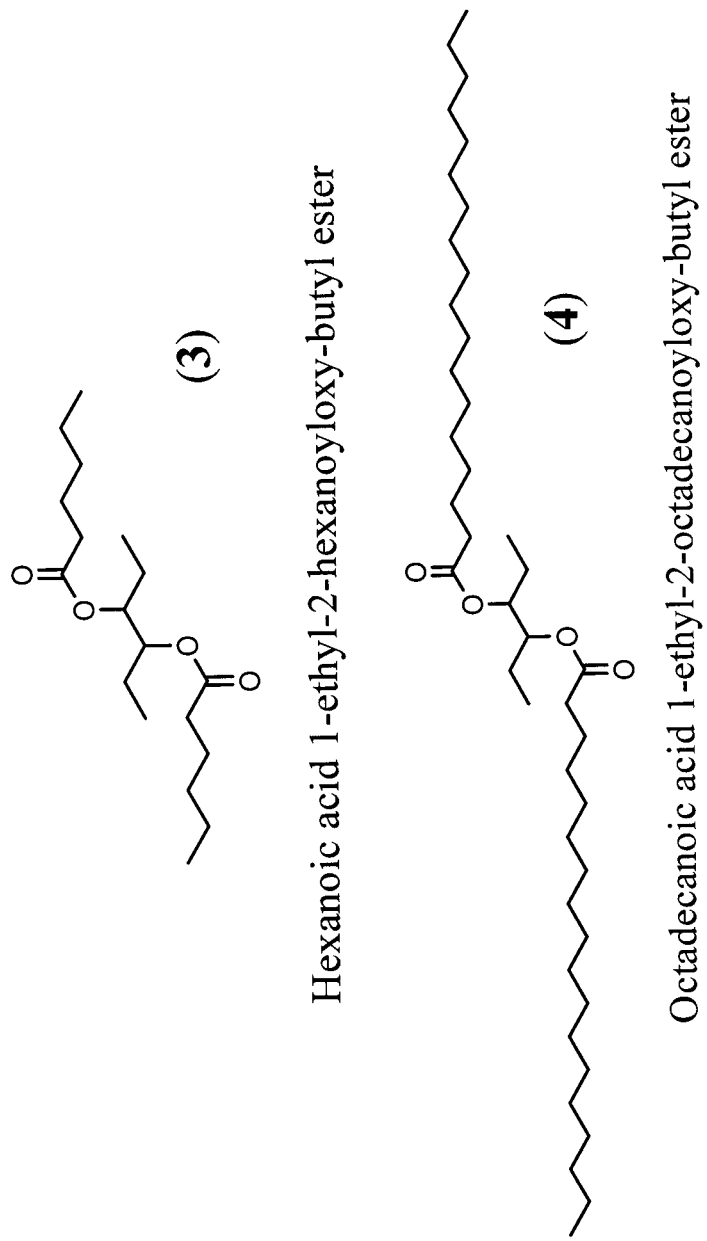

Using a synthetic strategy in accordance with that outlined in Scheme 1 (FIG. 2A), 7-tetradecene was converted to diester derivatives 1B and 2B via acylation of tetradecane-7, 8-diol intermediate with hexanoyl and decanoyl chlorides, respectively, as shown in FIG. 3A. Other exemplary diesters are depicted in FIG. 4A, diester derivatives 3B & 4B.

Variations

Variations (i.e., alternate embodiments) on the above-described lubricant compositions include, but are not limited to, utilizing mixtures of isomeric olefins and or mixtures of olefins having a different number of carbons. This leads to diester mixtures in the product compositions.

Variations on the above-described processes include, but are not limited to, using carboxylic acids derived from FT alcohols by oxidation.

The refrigerator oils of the present invention, which may comprise at least one of the FT derived or bio-mass derived triesters as the base oil, should have a viscosity and pour point which is suitable for a refrigerator oil. Preferably, the pour point is not greater than −10° C. More preferred, the pour point is from about −20° C. to about −80° C. Most preferred, the pour point is from −25° C. to about −70° C. It is desirable to have a pour point greater than −10° C. in order to prevent the oils from solidifying at a low temperature. Further, the refrigerator oils preferably have a kinematic viscosity of not less than 2 cSt, and preferably not less than 3 cSt at 100° C. It is desirable to have a kinematic viscosity of not less than 2 cSt in order to keep the sealability of the compressor when used. Furthermore, the refrigerator oils should preferably have a kinematic viscosity of no more than 150 cSt. More preferred, the kinematic viscosity should be no more than 100 cSt at 100° C., in view of their fluidity at a low temperature and the efficiency of heat exchange in the evaporator when used.

B. Refrigerant

The refrigerants which may be employed in refrigerators in which the refrigerator oils of the present invention are suitably used, include halohydrocarbons such as fluoroalkanes having 1-3 carbon atoms, preferably 1-2 carbon atoms and/or chlorofluoroalkanes having 1-3 carbon atoms, preferably 1-2 carbon atoms. The said halohydrocarbons are exemplified by HFCs (chlorine-free type halocarbons) such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a) and 1,1-difluoroethane (HFC-152a); HCFCs (chlorine-containing type halocarbons) such as monochlorodifluoromethane (HCFC-22), 1-chloro-1,1-difluoroethane (HCFC-142b), dichlorotrifluoroethane (HCFC-123) and monochlorotetrafluoroethane (HCFC-124); and mixtures thereof. Among these halohydrocarbons, the chlorine-free type halocarbons such as HFC-32, HFC-23, HFC-125, HFC-134, HFC-134a and HFC-152a, are preferable in view of the environmental problems. The refrigerant used may suitably be selected from these halocarbons mentioned above depending on the purpose for which the resulting refrigerant is used as well as the properties which are desirable for the resulting refrigerant. The preferable refrigerants are exemplified by HFC-134a; a mixture of HFC-134a (60-80 wt %) and HFC-32 (40-20 wt %); a mixture of HFC-32 (50-70 wt %) and HFC-125 (50-30 wt %); a mixture of HFC-134a (60 wt %), HFC-32 (30 wt %) and HFC-125 (10 wt %); a mixture of HFC-134a (52 wt %), HFC-32 (23 wt %) and HFC-125 (25 wt %); and a mixture of HFC-143a (52 wt %), HFC-125 (44 wt %) and HFC-134a (4 wt %).

When the refrigerator oil of the present invention is used in a refrigerator, it is usually present in the form of a fluid composition for the refrigerator, which is a mixture of the refrigerator oil and a chlorine-free type halogenocarbon such as a fluoroalkane and/or a chlorofluoroalkane as mentioned above.

The mixing ratio of the refrigerator oil and the refrigerant in the resulting composition is not particularly limited, but the refrigerator oil is usually comprised in an amount of 1-500 parts by weight, preferably in an amount of 2-400 parts by weight, based on 100 parts by weight of the refrigerant.

The refrigerator oils of the present invention are very excellent in compatibility with the halohydrocarbons as compared with the heretofore known refrigerator oils. Further, the refrigerator oils of the present invention are excellent because they have not only high compatibility with the halohydrocarbons and high electrical insulating property but also high lubricity, low hygroscopicity and high thermal and chemical stability.

The refrigerator oils of the present invention may particularly preferably be used in refrigerators, air-conditioners, dehumidifiers, cold-storage chests, freezers, freeze and refrigeration warehouses, automatic vending machines, showcases, cooling units in chemical plants, and the like which have a reciprocating or rotary compressor. The refrigerator oils of the present invention may also be employed in vehicular air conditioning systems. Further, the above refrigerator oils may also preferably be used in refrigerators having a centrifugal compressor.

C. Other Additives

To further enhance the refrigerator oil of this invention in performances, the refrigerator oil may be incorporated, as required, with heretofore known additives for a refrigerator oil, which include phenol antioxidants such as di-tert-butyl-p-cresol and bisphenol A; amine antioxidants such as phenyl-alpha-naphthylamine and N,N-di(2-naphthyl)-p-phenylene-diamine; wear resistant additives such as zinc dithiophosphate; extreme pressure agents such as chlorinated paraffin and sulfur compounds; oiliness improvers such as fatty acids; antifoaming agents such as silicone-type ones; and metal inactivators such as benzotriazole. These additives may be used singly or jointly. The total amount of these additives added is ordinarily not more than 10% by weight, preferably not more than 5% by weight, of the total amount of the refrigerator oil. The various additives which may be incorporated in the base oil are collectively referred to as "an additive group" for brevity.

Other embodiments will be obvious to those skilled in the art.

D. Examples

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

As an exemplary synthetic procedure, the synthesis of triester 1 (FIG. 3) is described in Examples 1-5. This procedure is representative for making triesters from mono-unsaturated carboxylic acids and alcohols, in accordance with some embodiments of the present invention.

Example 1

This Example serves to illustrate synthesis of an unsaturated acyl chloride (oleic acid chloride) en route to synthesis of a triester species, in accordance with some embodiments of the present invention (see, e.g., FIG. 2, Scheme 1). Oleic acid chloride was prepared according to the following procedure.

A three-neck 2-liter (L) round bottom reaction flask was fitted with a mechanical stirrer, reflux condenser and a water-filled trap to catch the evolving $SO_2$ and HCl gases. The flask was charged with 500 mL dichloromethane and 168 grams (0.14 mol) thionyl chloride. The reaction was cooled to 0° C. by means of an ice bath, and 200 grams (0.71 mol) of oleic acid was added drop-wise to the reaction vessel via an addition funnel. Once all of the oleic acid was added, the ice bath was replaced with a heating mantle and the reaction mixture was refluxed until the evolution of gases was ceased. The reaction mixture was cooled and concentrated on a rotary evaporator under reduced pressure to remove the solvent (dichloromethane) and excess thionyl chloride. The reaction afforded the desired oleoyl chloride as viscous oil in ~98% yield (210 g). The product identity was confirmed with nuclear magnetic resonance (NMR) and infrared (IR) spectroscopies, as well as gas chromatography/mass spectrometry (GC/MS).

Example 2

This Example serves to illustrate the synthesis of a mono-unsaturated ester from an unsaturated acyl chloride en route to synthesis of a triester species, in accordance with some embodiments of the present invention. Hexyl oleate was prepared from oleoyl chloride and hexanol in the presence of trimethyl amine according to the procedure below.

In a 3-neck 2-L reaction flask equipped with a mechanical stirrer, dropping funnel and a reflux condenser, 100 grams (0.33 mol) of oleoyl chloride (synthesized according to the procedure described in Example 1 above) were added dropwise to a solution of 51 grams (0.5 mol) hexanol and 42 grams (0.41 mol) triethylamine at 0° C. in 800 mL anhydrous hexanes. Once the addition was complete, the reaction mixture was heated to reflux overnight. The reaction mixture was cooled down and neutralized with water. The two-layer solution was transferred to a separatory funnel, and the organic layer was separated and washed a few times with water. The aqueous layer was extracted with 500 mL of ether, and the ether extract was added to the organic layer and dried over $MgSO_4$. Filtration and concentration at reduced pressure gave the desired hexyl oleate mixed with excess hexanol. The products were purified by column chromatography by eluting first with hexanes and then with 3% ethyl acetate in hexane. The product was isolated as a pale yellow oil with a sweet ester odor. The product identity was confirmed with NMR and IR spectroscopies, as well as GC/MS. The reaction afforded a 93% yield (112 grams) of hexyl oleate.

Example 3

This Example serves to illustrate synthesis of an epoxy-ester species, in accordance with some embodiments of the present invention.

Epoxy-hexyl oleate [8-(3-octyl-oxiranyl)-octanoic hexyl ester] was made by epoxidation of the carbon-carbon double of hexyl oleate (synthesized according to the procedure described in Example 2 above) using meta-chloroperbenzoic acid (mCPBA) as the epoxidation agent. The synthesis is as follows.

A 1-L round bottom 3-neck reaction flask was equipped with a mechanical stirrer, powder funnel, and a reflux condenser. The flask was charged with 500 mL of dichloromethane and 110 grams (0.3 mol) hexyl oleate. The solution was cooled to 0° C., and 110 l grams of 77% meta-chloroperoxybenzoic acid (0.45 mol mCPBA) was added in small portions over a period of about 30 minutes. Once all of the mCPBA was added, the reaction was allowed to stir for 48 hours at room temperature. The resulting milky reaction solution was filtered, and the filtrate was washed twice with the slow addition of a 10% aqueous solution of sodium bicarbonate. The organic layer was washed several times with water, dried over anhydrous $MgSO_4$, and filtered. The filtrate was evaporated to give a waxy looking substance. NMR, IR and GC/MS analysis confirmed the authenticity of the product. The reaction yielded 93 grams (81%) that was fairly pure by GC/MS analysis.

Example 4

This Example serves to illustrate synthesis of a dihydroxy ester species, in accordance with some embodiments of the present invention.

Epoxide ring opening to the corresponding 9,10-dihydroxy-octadecanoic acid hexyl ester was accomplished by stirring the epoxy-ester species synthesized in Example 3 in a 3 wt % aqueous solution of perchloric acid ($HClO_4$) as follows.

In a 1-L reaction flask equipped with an overhead stirrer, 90 grams (0.23 mol) of the epoxy-ester were suspended in 300 mL of 3 wt % aqueous solution of perchloric acid and 300 mL hexane in a 2-L reaction flask. The suspension was vigorously stirred for 3 hours. The two-layer solution was separated and the aqueous layer was extracted with 300 mL ethyl acetate. The organic phases were combined and dried over $MgSO_4$. Filtration and concentration at reduced pressure on a rotary evaporator produced a viscous oil. Upon standing at room temperature, the oil separated into an oily phase and a white precipitate. The solids were separated from the oil by filtration. IR and GC/MS analysis showed the solid to be the desired dihydroxy ester species. The oily portion contained a number of unidentified products (diol- and hydroxyl-containing products, ester hydrolysis products, elimination products, and carbonyl-containing products). The reaction afforded approximately 52% (47 grams) of the desired 9,10-dihydroxy-octadecanoic acid hexyl ester.

Example 5

This Example serves to illustrate synthesis of a triester from a dihydroxy-ester, in accordance with some embodiments of the present invention.

Esterification of 9,10-dihydroxy-octadecanoic acid hexyl ester with hexanoyl chloride to 9,10-bishexanoyloxy-octadecanoic acid hexyl ester was accomplished by reacting the parent diol-ester with hexanoyl chloride (hexanoic acid chloride) in the presence of trimethyl amine in anhydrous hexanes according to the procedure below.

In a 1-L 3-neck reaction flask equipped with an overhead stirrer, reflux condenser, and a heating mantle, 45 grams (0.11 mol) of the dihydroxy ester (9,10-dihydroxy-octadecanoic acid hexyl ester, prepared according to the procedure of Example 4) and 33 grams of trimethyl amine (0.33 mol) were mixed in 250 mL anhydrous hexanes. To this mixture, 44 grams (0.33 mol) of hexanoyl chloride (Aldrich Chemical Co.) was added dropwise via an addition funnel over a 30-minute period. Once the addition was completed, the reaction was refluxed for 48 hours. The resulting milky solution was neutralized with water. The resulting two-phase solution was separated by means of a separatory funnel. The organic layer was washed extensively with water and the aqueous layer was extracted with 300 mL of ether. The organic layers were combined and dried over anhydrous $MgSO_4$, filtered, and concentrated at reduced pressure. GC/MS analysis of the resulting diester indicated the presence of hexanoic acid. The product was then washed with an ice-cold sodium carbonate solution to remove the residual hexanoic acid. The solution was extracted with ethyl acetate which was dried over $Na_2SO_4$, filtered, and concentrated to give the final desired triester (1) as a colorless oil in 83% yield (65 grams). The authentication of the final triester product was based on GC/MS, IR, and NMR analysis.

Example 6

This Example serves to illustrate the synthesis of 9,10-bis-decanoyloxy-octadecanoic acid decyl ester (2), in accordance with some embodiments of the present invention.

Decyl oleate was synthesized using the synthetic protocols described in Examples 1 and 2. The 9,10-dihydroxy-ocatanoic acid decyl ester was synthesized by epoxidizing decyl oleate according to the epoxidation procedure described in Example 3 followed by epoxide ring opening to the corresponding diol using the synthetic procedure described in Example 4. The triester, 9,10-bis-decanoyloxy-octadecanoic acid decyl ester, was synthesized by reacting 9,10-dihydroxy-ocatanoic acid decyl ester with decanoyl chloride (decanoic acid chloride) according to the procedure described in Example 5.

Example 7

This Example serves to illustrate the synthesis of 9,10-bis-hexanoyloxy-octadecanoic acid methyl ester (3), in accordance with some embodiments of the present invention.

9,10-bis-hexanoyloxy-octadecanoic acid methyl ester was synthesized using the same procedures described above from making 9,10-bis-hexanoyloxy-octadecanoic acid hexyl ester, but starting with methyl oleate instead of hexyl oleate. 9,10-bis-hexanoyloxy-octadecanoic acid methyl ester is a colorless oil with viscosity index (VI) of 110, viscosity of 12.9 at 40° C. and 3.18 at 100° C., pour point of −46° C., and cloud point of −33° C.

Example 8

This Example serves to illustrate a synthesis of 9,10-bis-decanoyloxy-octadecanoic acid hexyl ester, in accordance with some embodiments of the present invention.

To a solution of oleic acid (1 mole) and excess hexanol (2 mole equivalents), in a reaction flask equipped with a mechanical (overhead) stirrer and a reflux condenser, 10 mol % sulfuric acid is added and the mixture is heated at reflux. The reaction is driven to completion by removing water. Reaction progress is monitored by acid number determination. Once the reaction is finished, the mixture is cooled to room temperature and the reaction is worked up by washing with excess water and separating the oleic acid hexyl ester product from excess hexanol by distillation. Treating the resulting hexyl oleate according to the procedure described in Example 3 makes the epoxide ring [8-(3-octyl-oxyranyl-octadecanoic acid hexyl ester]. Subjecting the epoxide ring derivative to the synthetic procedure described in Example 4 produces the 9,10-dihydroxy-octadecanoic acid hexyl ester. To a mixture of the resulting diol (9,10-dihydroxy-octadecanoic acid hexyl ester) and excess decanoic acid (4 mole equivalents), 10 mol % sulfuric acid is added and the mixture is heated at reflux. The reaction is driven to completion by removing water azeotropically by introducing an azeotroping agent such as xylenes. Once the reaction is finished, the mixture is cooled down and washed with excess water. The triester 9,10-bis-decaoyloxy-octadecanoic acid hexyl ester product is separated from excess decanoic acid by distillation or by neutralizing the excess acid with one or more mild neutralizing agents like calcium hydride or sodium carbonate followed by filtration. The neutralized acid is recovered by acidification.

Example 9

This Example serves to illustrate the lubrication properties of some exemplary bioesters suitable for use as lubricants, in accordance with some embodiments of the present invention.

Figure 5:
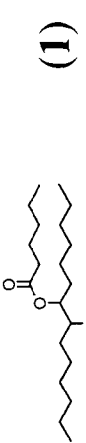
FIG. 5 summarizes properties of diesters herein.
Figure 5:
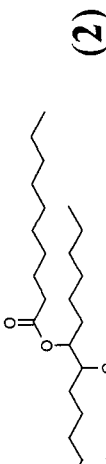
Figure 5:
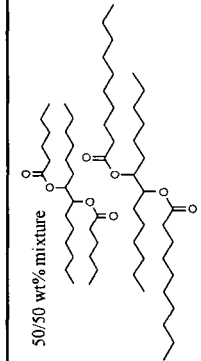

Esters 1 and 2 were prepared as described above and were tested and analyzed for several physical and lubricant properties including viscosity, viscosity index, cloud point, pour point and oxidation stability (see, e.g., ASTM Standard Test Method D 4636). These esters showed very promising lubricant properties. Table 1 (FIG. 4) summarizes the results of some of these tests and analyses. Table 2 (FIG. 5) summarize examples of some commercial refrigerator oils. It should be noted that the refrigerator oils of the present invention have the same or better cloud point and pour point characteristics when compared to the commercial refrigerator oils.

What is claimed is:
1. A refrigerator oil composition comprising
(a) a triester species having the following structure:

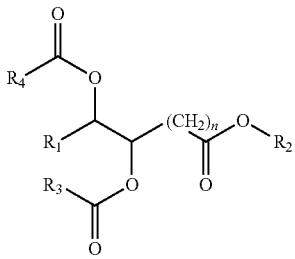

wherein $R_1$, $R_2$, $R_3$, and $R_4$ are the same or independently selected from hydrocarbon groups having from 2 to 20 carbon atoms and wherein "n" is an integer from 2 to 20; and
(b) a refrigerant, wherein the refrigerant is a halocarbon.
2. The refrigerator oil composition of claim 1 wherein the halocarbon comprises a chlorine-free type halocarbon, a chlorine-containing type halocarbon, or mixtures thereof.
3. The refrigerator oil composition of claim 2 wherein halocarbon is selected from the group consisting of: difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a), monochlorodifluoromethane (HCFC-22), 1-chloro-1,1-difluoroethane (HCFC-142b), dichlorotrifluoroethane (HCFC-123) and monochlorotetrafluoroethane (HCFC-124); and mixtures thereof.
4. The refrigerator oil composition of claim 1 wherein the triester species is derived from a process comprising:
(a) esterifying a mono-unsaturated fatty acid having from 10 to 22 carbon atoms with an alcohol thereby forming an unsaturated ester;
(b) epoxidizing the unsaturated ester in step (a) thereby forming an epoxy-ester species comprising an epoxide ring;
(c) opening the ring of the epoxy-ester species in step (b) thereby forming a dihydroxy ester; and
(d) esterifying the dihydroxy ester in step (c) with an esterifying species to form a triester species, wherein the esterifying species is selected from the group consisting of carboxylic acids, acyl halides, acyl anhydrides, and combinations thereof, and wherein the esterifying species has a carbon number of from 2 to 18.
5. The refrigerator oil composition of claim 1 wherein pour point is less than −25° C.
6. The refrigerator oil composition of claim 1 wherein the cloud point is less than 0° C.
7. The refrigerator oil composition of claim 4 wherein the esterifying species is a carboxylic acid.
8. The refrigerator oil composition of claim 7 wherein the carboxylic acid is derived from a bio-derived fatty acid.
9. The refrigerator oil composition of claim 7 wherein the carboxylic acid is derived from alcohols generated by a Fischer-Tropsch process.

* * * * *